(12) United States Patent
Ozaki et al.

(10) Patent No.: US 12,384,481 B2
(45) Date of Patent: Aug. 12, 2025

(54) VEHICLE

(71) Applicant: Honda Motor Co., Ltd., Tokyo (JP)

(72) Inventors: Kazumasa Ozaki, Saitama (JP); Tomokazu Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 96 days.

(21) Appl. No.: 18/173,771

(22) Filed: Feb. 23, 2023

(65) Prior Publication Data

US 2023/0294788 A1    Sep. 21, 2023

(30) Foreign Application Priority Data

Mar. 18, 2022   (JP) .................................. 2022-044448

(51) Int. Cl.
  B62K 11/00   (2006.01)
  B62J 1/06    (2006.01)
(52) U.S. Cl.
  CPC ............... B62K 11/007 (2016.11); B62J 1/06 (2013.01); *B62K 2204/00* (2013.01)
(58) Field of Classification Search
  CPC .. B62K 11/007; B62K 2204/00; B62K 11/00; B62J 1/06; A61G 2203/40; A61G 2203/42; A61G 5/043; A61G 5/101; A61G 5/1029; A61G 5/1059; A61G 5/128; B62H 2700/00
  USPC .......................................................... 701/49
  See application file for complete search history.

(56) References Cited

U.S. PATENT DOCUMENTS

| | | | |
|---|---|---|---|
| 5,286,089 A * | 2/1994 | Goldman ............... | A47C 7/024 5/653 |
| 12,083,935 B2 * | 9/2024 | Yada ..................... | B60N 2/1665 |
| 2018/0001729 A1 * | 1/2018 | Goffer .............. | B60G 17/01908 |
| 2020/0117216 A1 * | 4/2020 | Sugimura ........ | G06Q 10/06315 |
| 2021/0282991 A1 | 9/2021 | Yada et al. | |
| 2024/0325221 A1 * | 10/2024 | Goto ....................... | A61G 5/104 |

FOREIGN PATENT DOCUMENTS

| | | |
|---|---|---|
| JP | H0374102 | 3/1991 |
| JP | 2000070308 | 3/2000 |
| JP | 2019119430 | 7/2019 |
| JP | 2021146747 | 9/2021 |
| WO | 2019244444 | 12/2019 |

OTHER PUBLICATIONS

"Notice of Reasons for Refusal of Japan Counterpart Application", issued on Jul. 1, 2025, with English translation thereof, pp. 1-7.

* cited by examiner

*Primary Examiner* — Shardul D Patel
(74) *Attorney, Agent, or Firm* — JCIPRNET

(57) ABSTRACT

A vehicle 1 includes a vehicle body frame 2, a drive unit 3 provided in the vehicle body frame and movable on a floor, a seat 4 arranged above the vehicle body frame and supporting the buttocks of a user, a lifting device 5 provided between the vehicle body frame and the seat and lifting or lowering the seat between a low position and a high position, a battery 7 provided in the vehicle body frame, and a control device 6 controlling the drive unit and the lifting device. The control device prohibits lifting drive of the lifting device in response to the seat being at the low position and a lifting prohibition condition being satisfied.

20 Claims, 8 Drawing Sheets

VEHICLE

CROSS-REFERENCE TO RELATED APPLICATION

This application claims the priority benefits of Japanese application no. 2022-044448, filed on Mar. 18, 2022. The entirety of the above-mentioned patent application is hereby incorporated by reference herein and made a part of this specification.

BACKGROUND

Technical Field

The disclosure relates to a vehicle that has a drive unit and a seat provided on the drive unit via a lifting device.

Description of Related Art

Patent Literature 1 (International Publication No. 2019-244444) discloses a vehicle that has a drive unit, a seat provided on the drive unit via a lifting device, and a plurality of support legs extending downward from the seat. The plurality of support legs have rollers at the lower ends and are grounded on the floor via the rollers. When the seat is at a low position, the vehicle maintains the posture by having the plurality of support legs grounded on the floor. The plurality of support legs are separated from the floor when the seat is at a high position. In this state, the vehicle maintains the posture by inverted pendulum control of the drive unit.

When the seat is at the high position, the vehicle requires greater stability and safety due to the elevated position of the user.

SUMMARY

One aspect of the disclosure is a vehicle (1), including: a vehicle body frame (2); a drive unit (3) provided in the vehicle body frame and movable on a floor; a seat (4) arranged above the vehicle body frame and supporting buttocks of a user; a lifting device (5) provided between the vehicle body frame and the seat and lifting or lowering the seat between a low position and a high position; a battery (7) provided in the vehicle body frame; and a control device (6) controlling the drive unit and the lifting device. The control device prohibits lifting drive of the lifting device in response to the seat being at the low position and a lifting prohibition condition being satisfied.

DESCRIPTION OF THE EMBODIMENTS

Figure 1:
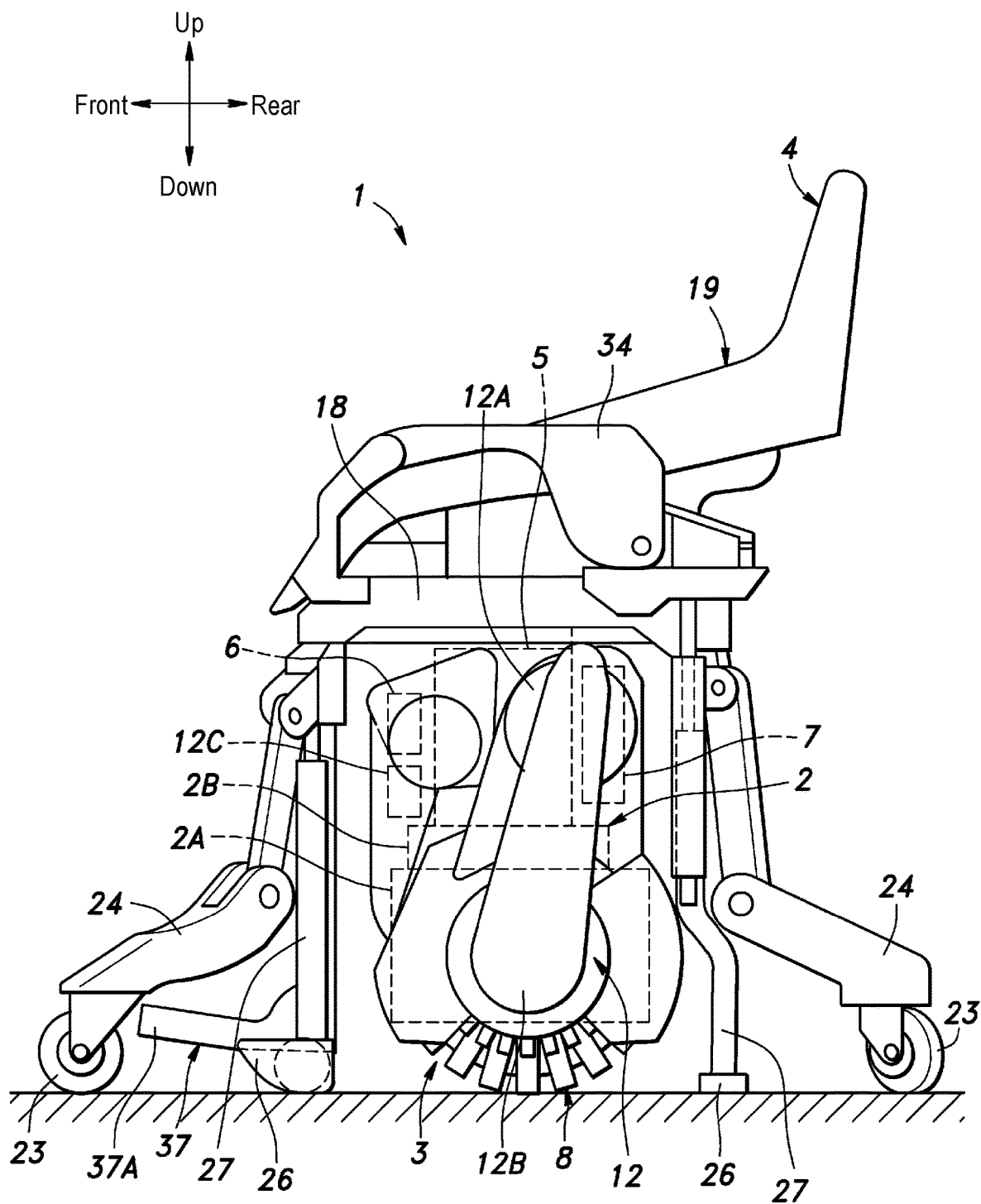
FIG. 1 is a side view of the vehicle when the seat is at the low position, as viewed from the left.

In view of the background described above, the disclosure further improves the safety of a vehicle in which a seat can move between a low position and a high position.

One aspect of the disclosure for solving the above problem is a vehicle (1), including: a vehicle body frame (2); a drive unit (3) provided in the vehicle body frame and movable on a floor; a seat (4) arranged above the vehicle body frame and supporting buttocks of a user; a lifting device (5) provided between the vehicle body frame and the seat and lifting or lowering the seat between a low position and a high position; a battery (7) provided in the vehicle body frame; and a control device (6) controlling the drive unit and the lifting device. The control device prohibits lifting drive of the lifting device in response to the seat being at the low position and a lifting prohibition condition being satisfied.

According to this aspect, since the control device determines whether the lifting prohibition condition is satisfied, and prohibits the lifting drive of the lifting device when the lifting prohibition condition is satisfied, the safety of the vehicle is further improved. According to this aspect, it is possible to provide a safe and highly convenient vehicle for the elderly and the physically handicapped.

In the above aspect, the drive unit may include an electric motor (12A) and a power drive unit (12C) that supplies electric power to the electric motor. The control device may determine whether the vehicle has an abnormality. The vehicle may include: an inclination angle acquisition part (45) acquiring an inclination angle of the vehicle body frame with respect to a horizontal plane; an SOC acquisition part (53) acquiring an SOC of the battery; and a temperature acquisition part (12D) acquiring a temperature of at least one of the power drive unit, the electric motor, and the battery. The lifting prohibition condition may include at least one of the inclination angle being equal to or greater than a first angle threshold, the temperature of the power drive unit being equal to or higher than a first power drive unit temperature threshold, the temperature of the electric motor being equal to or higher than a first electric motor temperature threshold, the temperature of the battery being equal to or higher than a first battery temperature threshold, the SOC of the battery being equal to or less than a first SOC threshold, and the control device detecting an abnormality of the vehicle.

According to this aspect, since the seat is prohibited from moving to the high position when at least one of the SOC being low, the temperature of the power drive unit being high, the temperature of the electric motor being high, the temperature of the battery being high, the road surface being inclined by a predetermined value or more, and the vehicle having an abnormality is satisfied, the safety of the vehicle is further improved.

In the above aspect, the control device may drive the lifting device to lower in response to the seat being at the high position and a lowering condition being satisfied.

According to this aspect, since the seat is lowered to the low position when the seat is at the high position and the lowering condition is satisfied, the safety of the vehicle is further improved.

In the above aspect, the lifting device may include a holding mechanism for holding the seat at the high position, and the lifting device may move the seat from the high position to the low position by releasing the holding mechanism.

According to this aspect, the seat can be moved from the high position to the low position by releasing the holding mechanism. The energy required for releasing the holding mechanism is preferably smaller than the energy required for lowering drive of a drive source such as an electric motor.

In the above aspect, the lowering condition may include at least one of the temperature of the power drive unit being equal to or higher than a second power drive unit temperature threshold that is equal to or higher than the first power drive unit temperature threshold, the temperature of the electric motor being equal to or higher than a second electric motor temperature threshold that is equal to or higher than the first electric motor temperature threshold, the temperature of the battery being equal to or higher than a second battery temperature threshold that is equal to or higher than the first battery temperature threshold, and the SOC of the battery being equal to or less than a second SOC threshold that is equal to or less than the first SOC threshold.

According to this aspect, the safety of the vehicle is further improved.

In the above aspect, the control device may determine whether the inclination angle acquisition part is abnormal based on a signal from the inclination angle acquisition part, and the lowering condition may include at least one of the temperature of the power drive unit being equal to or higher than a second power drive unit temperature threshold that is equal to or higher than the first power drive unit temperature threshold, the temperature of the electric motor being equal to or higher than a second electric motor temperature threshold that is equal to or higher than the first electric motor temperature threshold, the temperature of the battery being equal to or higher than a second battery temperature threshold that is equal to or higher than the first battery temperature threshold, the SOC of the battery being equal to or less than a second SOC threshold that is equal to or less than the first SOC threshold, and the inclination angle acquisition part being abnormal.

According to this aspect, since the seat is lowered to the low position when it is determined that the inclination angle acquisition part is abnormal, the safety of the vehicle is further improved.

In the above aspect, the control device may prohibit traveling drive of the drive unit in response to the seat being at the high position and a traveling prohibition condition being satisfied.

According to this aspect, since the vehicle is prohibited from traveling when the seat is at the high position and the traveling prohibition condition is satisfied, the safety of the vehicle is further improved.

In the above aspect, the traveling prohibition condition may include at least one of the temperature of the power drive unit being equal to or higher than a third power drive unit temperature threshold that is lower than the second power drive unit temperature threshold, the temperature of the electric motor being equal to or higher than a third electric motor temperature threshold that is lower than the second electric motor temperature threshold, the temperature of the battery being equal to or higher than a third battery temperature threshold that is lower than the second battery temperature threshold, and the SOC of the battery being equal to or less than a third SOC threshold that is greater than the second SOC threshold.

According to this aspect, the safety during traveling of the vehicle is further improved.

In the above aspect, the control device may control the drive unit based on inverted pendulum control.

According to this aspect, the safety of the vehicle that performs inverted pendulum control is further improved.

The above aspect may further include at least one leg (24) that extends downward from the seat and includes a roller (23) at a lower end. The roller may be separated from the floor in response to the seat being at the high position, and the roller may contact the floor in response to the seat being at the low position.

According to this aspect, since the leg is grounded when the seat is at the low position, the posture of the vehicle is stabilized.

In the above aspect, the drive unit may be movable in all directions along the floor.

According to this aspect, the vehicle can move in all directions.

According to the above configuration, safety is further improved in the vehicle in which the seat can move between the low position and the high position.

An embodiment of a vehicle according to the disclosure will be described hereinafter with reference to the drawings. In this embodiment, the vehicle is configured as an inverted pendulum vehicle.

Figure 2:
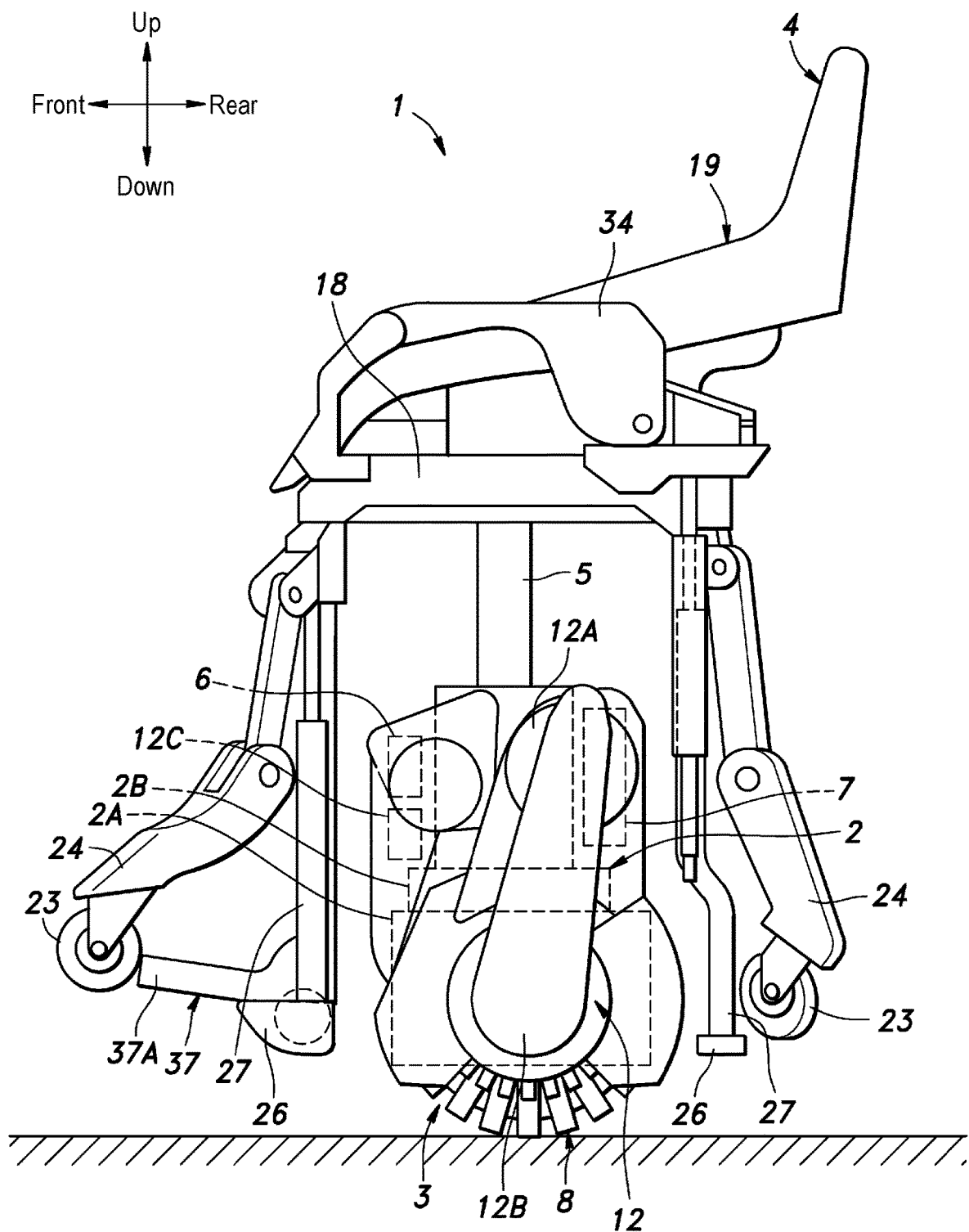
FIG. 2 is a side view of the vehicle when the seat is at the high position, as viewed from the left.

As shown in FIG. 1 and FIG. 2, the vehicle 1 includes a vehicle body frame 2, at least one drive unit 3 provided in the vehicle body frame 2 and movable on the floor, a seat 4 arranged above the vehicle body frame 2 and supporting the buttocks of a user, a lifting device 5 provided between the vehicle body frame 2 and the seat 4, a control device 6 controlling the drive unit 3 and the lifting device 5, and a battery 7 provided in the vehicle body frame 2.

The vehicle body frame 2 includes a lower frame 2A and an upper frame 2B connected to the upper part of the lower frame 2A. The upper frame 2B is connected to the lower frame 2A so as to be rotatable around a rotating shaft that extends front and rear.

Figure 3:
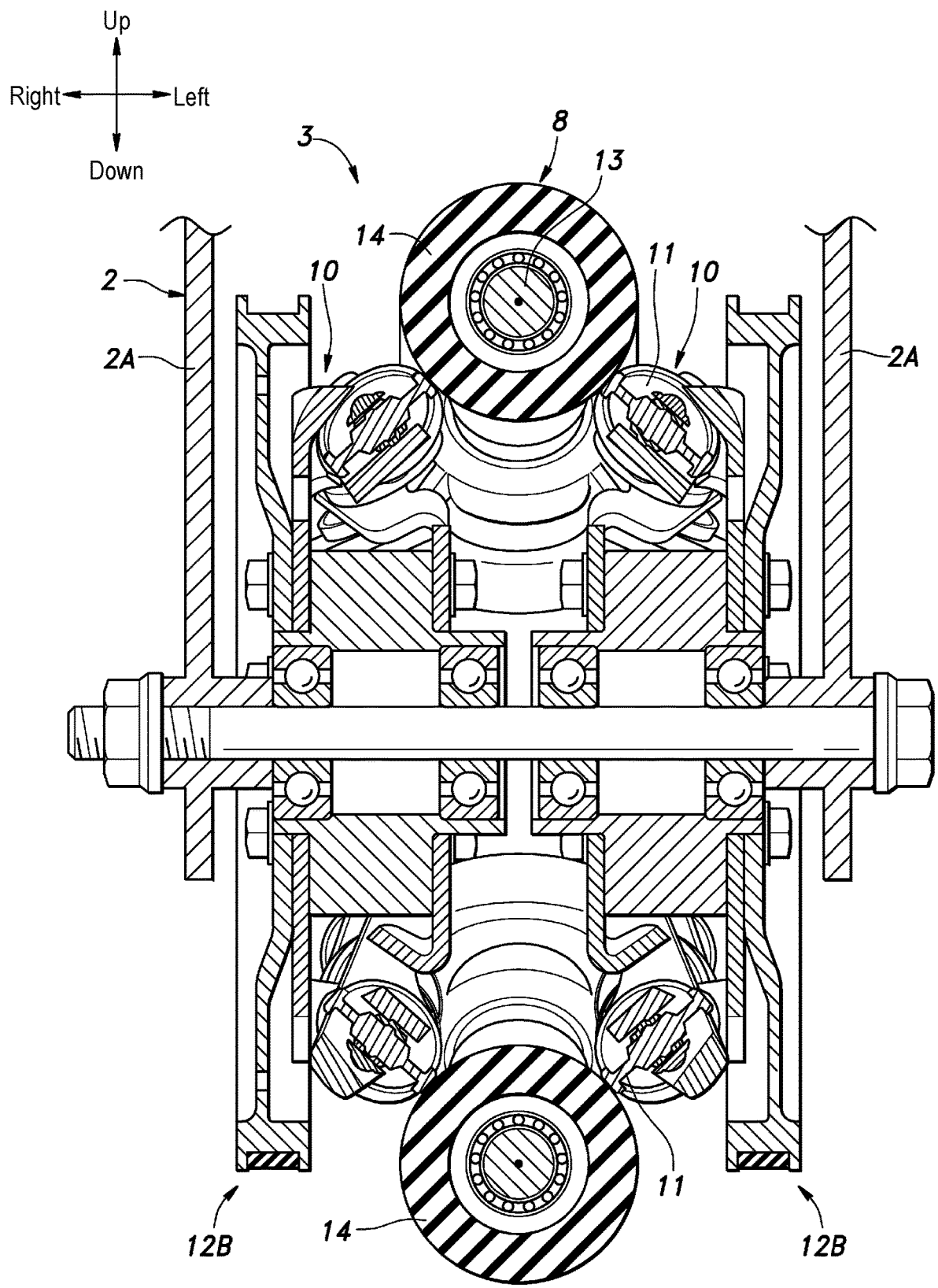
FIG. 3 is a cross-sectional view of the drive unit.

In this embodiment, a pair of left and right drive units 3 are provided on the left and right sides of the lower frame 2A. Each drive unit 3 includes an inverted pendulum-controlled drive wheel 8. In this embodiment, each drive unit 3 is a friction drive device that can move in all directions along the floor. As shown in FIG. 3, the friction drive device includes a pair of drive discs 10 rotatably supported by the lower frame 2A, a plurality of drive rollers 11 rotatably supported by each of the drive discs 10, an annular drive wheel 8 arranged between the left and right drive discs 10 and in contact with the drive rollers 11, and a pair of actuators 12 respectively rotating the pair of drive discs 10 independently. The pair of drive discs 10 are arranged coaxially with each other, and the rotational axes thereof extend in the left-and-right direction.

As shown in FIG. 1, each actuator 12 includes an electric motor 12A and a transmission mechanism 12B that transmits the rotational force of the electric motor 12A to the corresponding drive disc 10. The transmission mechanism 12B may be, for example, a belt transmission mechanism. The electric motor 12A may be arranged above the drive disc 10.

The drive unit 3 includes a power drive unit 12C that supplies electric power to the electric motor 12A. In other embodiments, the power drive unit 12C may be provided separately from the drive unit 3. The power drive unit 12C is an inverter circuit composed of a power semiconductor. The power semiconductor may be IGBT (insulated gate bipolar transistor), FET (field effect transistor), or the like.

The power drive unit 12C controls the rotation of the electric motor 12A by controlling the electric power supplied from the battery 7 to the electric motor 12A based on the signal from the control device 6. The power drive unit 12C may have the function of the control device 6.

The drive unit 3 includes a first temperature sensor 12D as the temperature acquisition part for acquiring the temperature Tp of the power drive unit 12C. The first temperature sensor 12D may be provided in the power drive unit 12C. The first temperature sensor 12D is connected to the control device 6. The first temperature sensor 12D may be connected to the power drive unit 12C, and the power drive unit 12C may acquire temperature information. The control device 6 may communicate with the power drive unit 12C to acquire the temperature information. In other embodiments, the control device 6 may constitute the temperature acquisition part. The control device 6 may acquire the value of the current flowing through the power drive unit 12C and estimate the temperature Tp of the power drive unit 12C based on the value of the current.

The drive unit 3 includes a second temperature sensor 12E as the temperature acquisition part for acquiring the temperature Tm of the electric motor 12A. The second temperature sensor 12E is connected to the control device 6. The second temperature sensor 12E may be connected to the power drive unit 12C, and the power drive unit 12C may acquire temperature information. The control device 6 may communicate with the power drive unit 12C to acquire the temperature information. In other embodiments, the control device 6 may constitute the temperature acquisition part. The control device 6 may acquire the value of the current flowing through the electric motor 12A and estimate the temperature Tm of the electric motor 12A based on the value of the current.

As shown in FIG. 1 and FIG. 3, the drive wheel 8 has an annular shape and is arranged coaxially with the drive discs 10 between the pair of drive discs 10. Further, the drive wheel 8 is in contact with the plurality of drive rollers 11 and is rotatable around the central axis and the annular axis. The drive wheel 8 includes, for example, an annular core 13 and a plurality of driven rollers 14 rotatably supported by the core 13. Each driven roller 14 is supported by the core 13 so as to be rotatable around the axis of the annular core 13. Each driven roller 14 receives a load from the drive disc 10 and rotates with respect to the core 13.

When the pair of drive discs 10 rotate in the same direction at the same rotational speed, the drive wheel 8 rotates in the same direction at the same rotational speed as the drive discs 10. The driven rollers 14 of the drive wheel 8 rotate with respect to the core 13 when the pair of drive discs 10 rotate in different directions or rotate at different speeds. Thus, the drive unit 3 can generate a propulsive force in the left-and-right direction with respect to the floor.

The battery 7 is supported at the rear part of the lower frame 2A. The control device 6 is supported inside or at the rear part of the lower frame 2A. The battery 7 includes an SOC acquisition part 7A. The SOC acquisition part 7A functions as the SOC acquisition part for acquiring the SOC (State of Charge) of the battery 7 based on the voltage of the battery 7. Further, the battery 7 includes a third temperature sensor 7B as the temperature acquisition part for acquiring the temperature Tb of the battery 7. The third temperature sensor 7B is connected to the control device 6. The third temperature sensor 7B may be connected to the temperature acquisition part of the battery 7, and the temperature acquisition part may be connected to the control device 6. The control device 6 may acquire the value of the current flowing from the battery 7 and estimate the temperature Tb of the battery 7 based on the value of the current.

The lifting device 5 is a device for lifting and lowering the seat 4 between a low position and a high position. The seat 4 includes a seat frame 18 supported by the lifting device 5 and a pad 19 supported by the upper part of the seat frame 18. The user can sit on the pad 19. The lifting device 5 is coupled to the upper frame 2B of the vehicle body frame 2 and the seat frame 18. The lifting device 5 displaces the seat frame 18 up and down with respect to the upper frame 2B of the vehicle body frame 2 by expanding and contracting in the up-and-down direction. The lifting device 5 may be, for example, a ball screw mechanism or a rack and pinion mechanism driven by an electric motor, or may be a linear motor. In addition, the lifting device 5 may be an air cylinder that expands and contracts with compressed air from a compressor. Further, the lifting device 5 may have a holding mechanism 5A for holding the seat 4 at the high position. The seat 4 may be moved from the high position to the low position when the holding mechanism 5A is released. The energy required for releasing the holding mechanism is preferably smaller than the energy required for lowering drive of a drive source such as an electric motor.

The lifting device 5 may include, for example, a base supported by the upper frame 2B, a movable body provided on the base to be movable up and down and coupled to the seat frame 18, a ball screw mechanism for moving the movable body with respect to the base, and an electric motor driving the ball screw mechanism.

As shown in FIG. 2, the high position of the seat 4 may be vertically above the low position of the seat 4. In other embodiments, the high position of the seat 4 may be laterally offset with respect to the low position of the seat 4.

Figure 4:
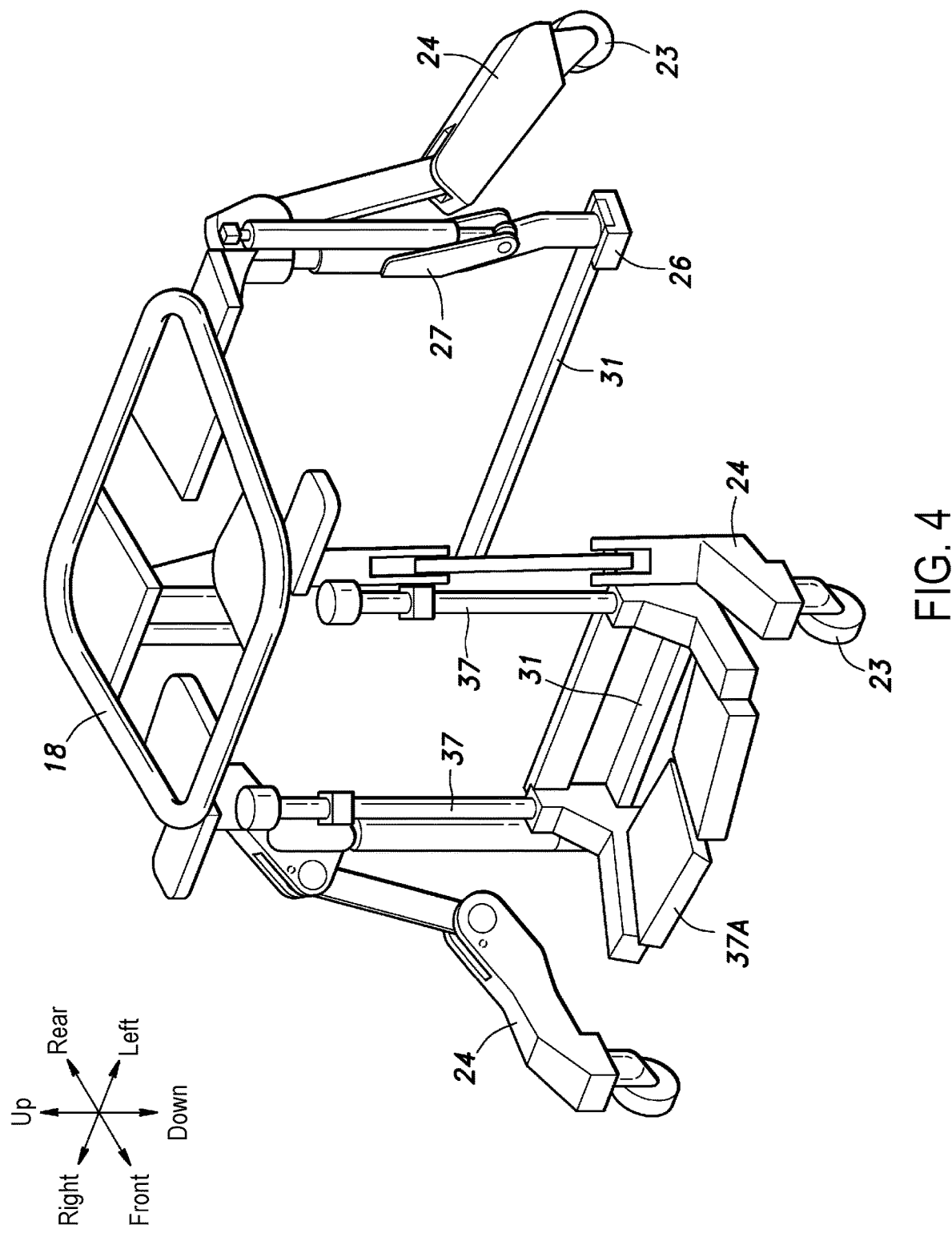
FIG. 4 is a perspective view of the seat frame assembly.

As shown in FIG. 4, the seat frame 18 is formed in a rectangular frame shape in plan view. The seat frame 18 is coupled to the upper end of the lifting device 5. The seat frame 18 supports the pad 19 from below.

The vehicle 1 includes at least one first leg 24 and at least one second leg 27. The first leg 24 extends downward from the seat 4 and has a roller 23 at the lower end. The second leg 27 extends downward from the seat 4 and has a contact member 26 at the lower end. In this embodiment, the vehicle 1 has four first legs 24 and four second legs 27. Each first leg 24 and each second leg 27 are rotatably coupled to the seat frame 18. Each first leg 24 has a similar configuration to each other, and each second leg 27 has a similar configuration to each other.

The first leg 24 is rotatable between a retracted position arranged close to the vehicle body frame 2 and a deployed position laterally away from the vehicle body frame 2 relative to the retracted position. The first leg 24 may have a joint in the middle part in the longitudinal direction.

The roller 23 is rotatably coupled to the lower end of the first leg 24. The roller 23 may be a caster whose rotational shaft rotates around the vertical axis with respect to the first leg 24. In other embodiments, a ball may be supported by the lower end of the first leg 24 instead of the roller 23.

The first leg 24 includes an urging member (not shown) that urges the first leg 24 from the deployed position toward the retracted position. The first leg 24 may include a damper that dampens rotation. The damper may be a rotary damper or a piston damper.

The second leg 27 can expand and contract in the up-and-down direction and is urged in the extending direction. The contact member 26 is provided at the lower end of the second leg 27. The contact member 26 preferably has higher flexibility than the second leg 27. In addition, the contact member 26 preferably has a higher coefficient of friction than the second leg 27. The contact member 26 may be made of rubber or elastomer, for example. The grounding of the contact member 26 can keep the vehicle 1, which is grounded via the rollers 23, in a stopped state. The vehicle 1 is kept stopped by the frictional force between the contact member 26 provided at the lower end of the second leg 27 and the floor. Since the frictional force between the contact member 26 and the floor keeps the vehicle 1 in the stopped state, there is no need to supply electric power to the drive unit 3, and the energy efficiency can be improved. Furthermore, by stopping the vehicle 1, the position of the center of gravity of the vehicle 1 can be easily determined when the seat 4 is moved to the high position and the inverted pendulum control is started.

The second leg 27 is urged in the extending direction by an urging member. The urging member may be a compression coil spring. The second leg 27 may include a damper that dampens the expansion and contraction. The damper may be a piston damper. The lower parts of two adjacent second legs 27 are connected to each other by a connecting member 31.

As shown in FIG. 2, when the seat 4 is at the high position, each roller 23 and each contact member 26 are separated from the floor. The lower end of each contact member 26 is arranged below the lower end of each roller 23 when the seat 4 is at the high position. As shown in FIG. 1, each roller 23 and each contact member 26 contacts the floor when the seat 4 is at the low position. When the seat 4 moves from the high position to the low position, each contact member 26 contacts the floor earlier than each roller 23. Thus, the vehicle 1 can come to a stop early when the seat 4 moves to the low position.

Each first leg 24 is pushed by the floor and moves from the retracted position to the deployed position. Thus, the distance between the grounding points of the first legs 24 is widened, and the posture of the vehicle 1 at the low position is stabilized.

Each second leg 27 is connected to a lever 34 via a transmission mechanism. In this embodiment, a pair of left and right levers 34 are provided on the left and right sides of the seat 4. When the seat 4 is at the low position, the user can operate the lever 34 to move the second leg 27 to the retracted position. Thus, when the seat 4 is at the low position, the contact member 26 is separated from the floor and the vehicle 1 can travel.

As shown in FIG. 4, the vehicle 1 includes at least one support member 37 that extends downward from the seat 4. The support member 37 has a footrest 37A supporting the user's sole at the lower part. The support member 37 and the footrest 37A are separated from the floor regardless of the position of the seat 4.

Figure 5:
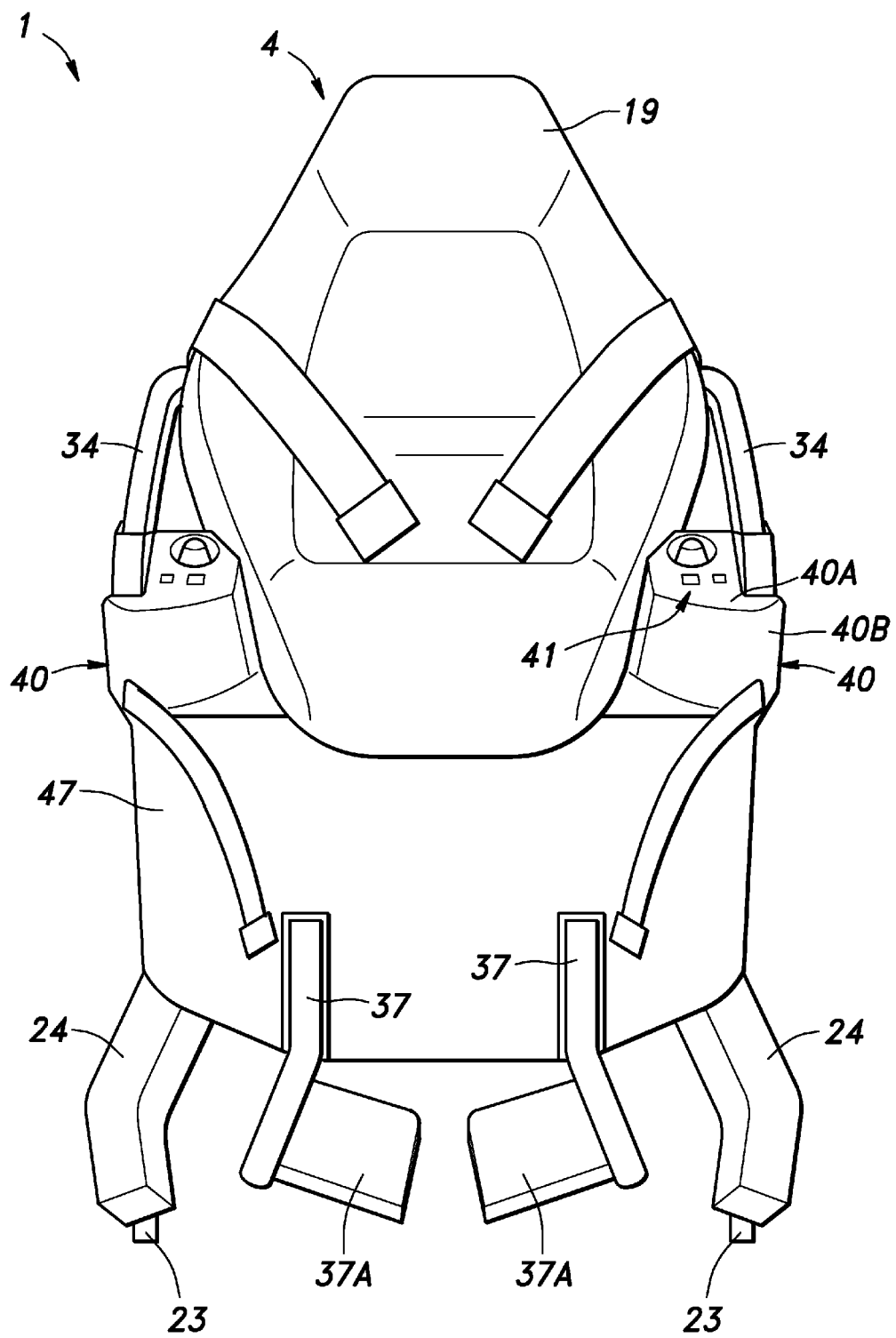
FIG. 5 is a perspective view of the vehicle, as viewed from above the front.
Figure 6:
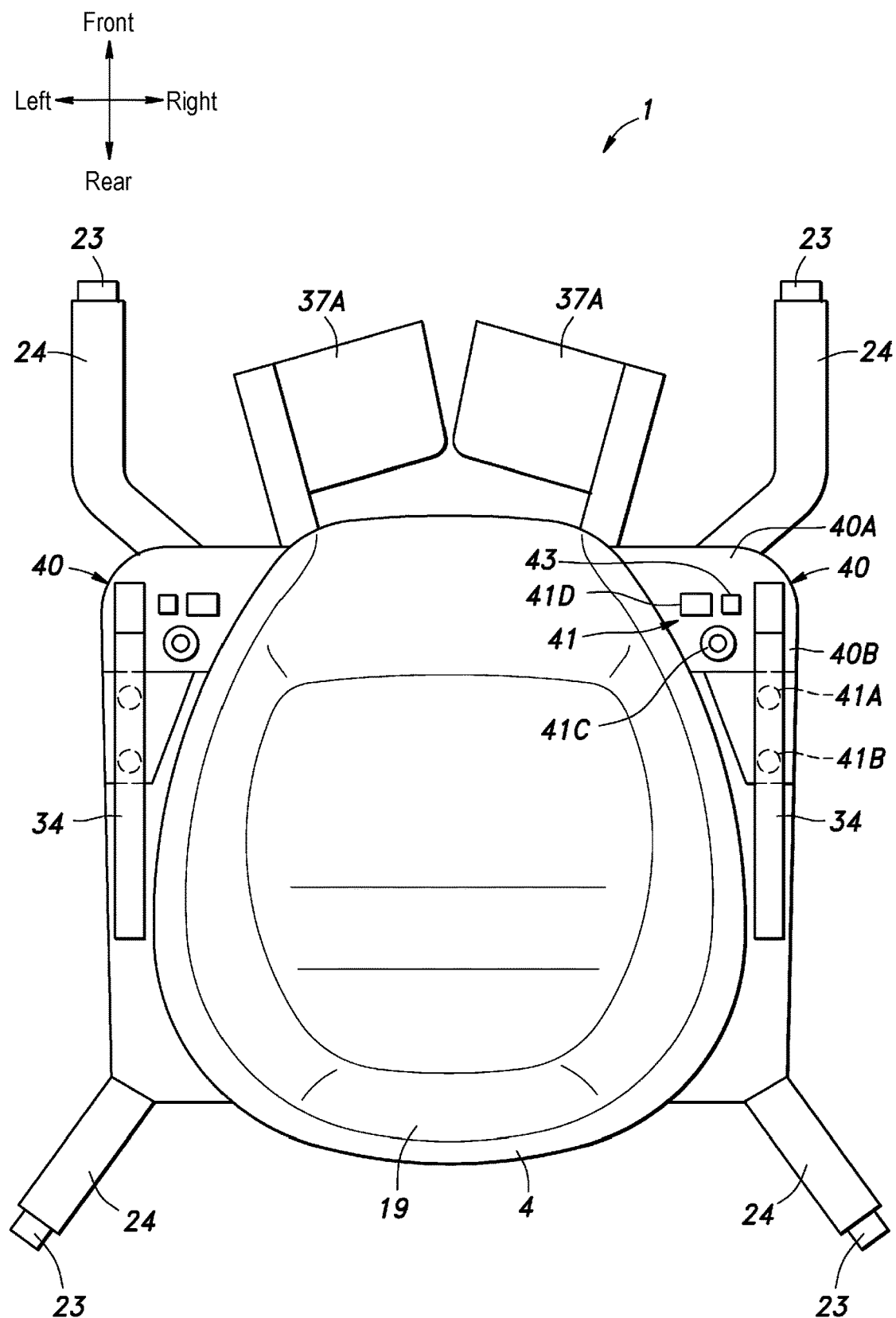
FIG. 6 is a plan view of the vehicle.
Figure 7:
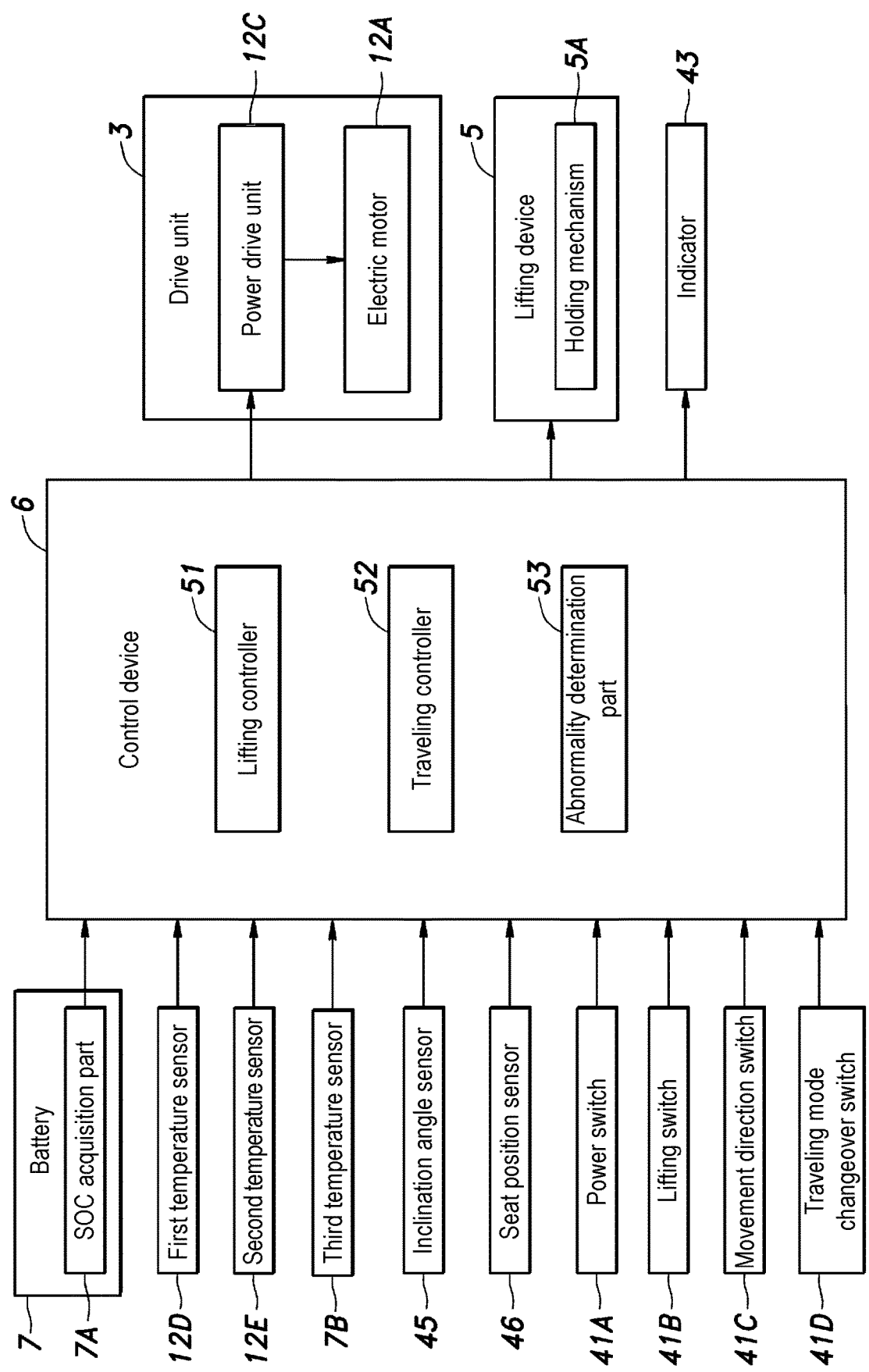
FIG. 7 is a block diagram showing the configuration of the control device.

As shown in FIG. 5 and FIG. 6, the vehicle 1 includes an operating device 40 provided on at least one of the left side and the right side of the seat 4. In this embodiment, the operating devices 40 are provided on both the left side and the right side of the seat 4. Thus, even if the user has a disability in one of the left and right hands, the user can still operate the vehicle 1 with the other hand. The left and right operating devices 40 preferably have the same configuration.

The operating device 40 includes an operation panel 40B having an operation surface 40A facing upward, and a plurality of operators 41 provided on the operation surface 40A. The lever 34 constitutes a part of the operating device 40 and extends upward and forward from the rear part of the operation panel 40B. The operation panel 40B may be supported by the seat frame 18. The operation panel 40B extends front and rear along the side of the pad 19.

As shown in FIG. 6, the plurality of operators 41 include a power switch 41A, a lifting switch 41B, a movement direction switch 41C, and a traveling mode changeover switch 41D. The power switch 41A, the lifting switch 41B, the movement direction switch 41C, and the traveling mode changeover switch 41D may be respectively provided on the left and right operating devices 40. The plurality of operators 41 are connected to the control device 6.

The movement direction switch 41C is a switch for operating the drive unit 3. The movement direction switch 41C is an operator that receives direction inputs corresponding to at least front, rear, left, and right performed by the user. The movement direction switch 41C may be a joystick. In other embodiments, the movement direction switch 41C may be four button switches corresponding to front, rear, right, and left.

The traveling mode changeover switch 41D is an operator that receives a mode changeover input corresponding to the mode changeover performed by the user. The traveling mode changeover switch 41D may be a push switch.

The operation surface 40A is provided with an indicator 43 for notifying the traveling mode being executed. The indicator 43 may have a first light emitting portion corresponding to a parallel movement mode and a second light emitting portion corresponding to a turning movement mode. The indicator 43 may be a display provided on the operation surface 40A.

At least one of the plurality of operators 41 may display the state of the vehicle 1 by lighting. For example, the power switch 41A may emit light when the vehicle 1 is powered on, that is, in the activated state. In addition, the lifting switch 41B may emit light while the lifting device 5 is being driven. Further, the lifting switch 41B may change the color of the emitted light according to the position of the seat 4. Also, the traveling mode changeover switch 41D may change the color of the emitted light according to the selected traveling mode.

The vehicle body frame 2 is provided with an inclination angle sensor 45 as the inclination angle acquisition part for acquiring an inclination angle θf of the vehicle body frame 2 with respect to the horizontal plane. The inclination angle sensor 45 may be a gyro sensor. The inclination angle sensor 45 may be configured by a known device that sequentially measures (estimates) the vehicle body inclination angle by detecting acceleration and angular velocity in three axial directions and performing strap down type arithmetic processing. However, the inclination angle sensor 45 is not limited to this aspect. For example, the inclination angle sensor 45 may be a sensor that detects the vehicle body inclination angle based on changes in the direction of gravitational acceleration with respect to the vehicle body frame 2. In that case, the inclination angle sensor 45 may be configured by a known device based on MEMS technology.

The inclination angle sensor 45 is provided in the upper frame 2B of the vehicle body frame 2. In other embodiments, the inclination angle sensor 45 may be provided in the seat frame 18.

The vehicle 1 includes a seat position sensor 46 that detects the position of the seat 4 with respect to the vehicle body frame 2. The seat position sensor 46 detects at least that the seat 4 is at the low position and the high position. The seat position sensor 46 may be, for example, a proximity switch or a contact switch. In addition, the seat position sensor 46 may acquire the position of the seat 4 based on the expansion/contraction state of the lifting device 5. The seat position sensor 46 is connected to the control device 6.

An outer shell 47 may be attached to the lower part of the vehicle 1. Each second leg 27, each support member 37, and the upper part of each first leg 24 may be arranged inside the outer shell 47. The lower end of the first leg 24 and the footrest 37A may protrude outside the outer shell 47.

The control device 6 is an arithmetic device including a microprocessor (MPU), a non-volatile memory, a volatile memory, and an interface. The control device 6 realizes various applications by the microprocessor executing programs stored in the non-volatile memory. The control device 6 includes a lifting controller 51, a traveling controller 52, and an abnormality determination part 53. The lifting controller 51 controls the lifting device 5. The traveling controller 52 controls the electric motors 12A of the left and right drive units 3.

The abnormality determination part 53 determines whether the vehicle 1 has an abnormality. The abnormality determination part 53 may determine whether the vehicle 1 has an abnormality by comparing the values acquired by the SOC acquisition part 7A, the first temperature sensor 12D, the second temperature sensor 12E, the third temperature sensor 7B, the inclination angle sensor 45, and the seat position sensor 46 with corresponding abnormality determination values. Furthermore, the abnormality determination part 53 may determine whether the vehicle 1 has an abnormality by acquiring currents in the electric motor 12A and the power drive unit 12C and comparing them with corresponding abnormality determination values.

When the seat 4 is at the high position, the control device 6 controls the left and right drive units 3 based on inverted pendulum control. Thus, the inclination angle θf of the vehicle body frame 2 is maintained at 0 degree. When the inclination angle θf of the vehicle body frame 2 is 0 degree, the center of gravity of the vehicle 1 is positioned vertically above the rotational axis of the left and right drive wheels 8. In addition, based on the inclination angle θf of the vehicle body frame 2, the control device 6 drives the drive unit 3 so as to travel in the same direction as the inclination angle θf. Thus, the user seated on the seat 4 can move the vehicle 1 in any direction by shifting the weight.

The control device 6 controls the drive unit 3 based on the signal from the movement direction switch 41C to cause the vehicle 1 to travel when the seat 4 is at the low position. The control device 6 does not perform inverted pendulum control when the seat 4 is at the low position.

The control device 6 turns on/off the power of the vehicle 1 according to the operation of the power switch 41A performed by the user. The control device 6 drives the lifting device 5 to lift or lower the seat 4 according to the operation of the lifting switch 41B performed by the user.

Figure 8:
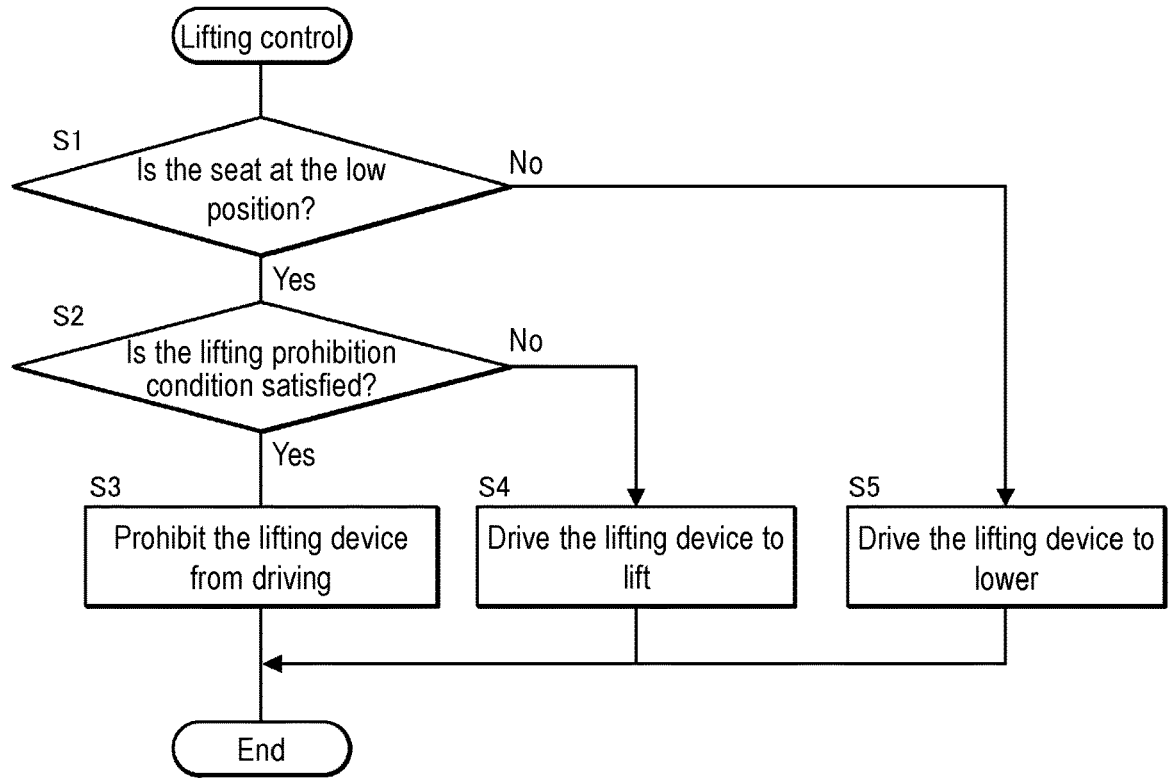
FIG. 8 is a flowchart showing the procedure of the lifting control.

The control device 6 controls the lifting device 5 according to the procedure of lifting control shown in FIG. 8. When the user presses the lifting switch 41B, the lifting controller 51 of the control device 6 starts the lifting control based on the signal from the lifting switch 41B.

The control device 6 first determines whether the seat 4 is at the low position based on the signal from the seat position sensor 46 (S1).

When the control device 6 determines that the seat 4 is at the low position (the determination result in S1 is Yes), the control device 6 determines whether a lifting prohibition condition is satisfied (S2). The lifting prohibition condition includes at least one of the inclination angle θf being equal to or greater than the first angle threshold θ1, the temperature Tp of the power drive unit 12C being equal to or higher than the first power drive unit temperature threshold Tp1, the temperature Tm of the electric motor 12A being equal to or higher than the first electric motor temperature threshold Tm1, the temperature Tb of the battery 7 being equal to or higher than the first battery temperature threshold Tb1, the SOC of the battery 7 being equal to or less than the first SOC threshold S1, and the control device 6 detecting an abnormality of the vehicle 1. Since the four first legs 24 are grounded when the seat 4 is at the low position, the inclination angle θf of the vehicle body frame 2 is equal to the inclination angle of the floor.

The plurality of first legs 24 are separated from the floor when the seat 4 moves from the low position to the high position. At this time, the control device 6 executes inverted pendulum control, and the inclination angle θf of the vehicle body frame 2 changes from the inclination angle of the floor to 0 degree. That is, the greater the inclination angle θf of the vehicle body frame 2 when the seat 4 is at the low position, the greater the change of the inclination angle θf of the vehicle body frame 2 when the first legs 24 are separated from the floor. The first angle threshold θ1 is set for the purpose of prohibiting the seat 4 from moving to the high position in the case where the amount of change of the inclination angle θf of the vehicle body frame 2 when the first legs 24 are separated from the floor is large.

If the temperature Tp of the power drive unit 12C rises, the power drive unit 12C may be damaged. If the temperature Tm of the electric motor 12A rises, the electric motor 12A may be damaged. If the temperature Tb of the battery 7 rises, the battery 7 may be damaged. When the seat 4 moves from the low position to the high position, the control device 6 starts inverted pendulum control. Since it is necessary to constantly control the electric motor 12A during execution of the inverted pendulum control, the temperature Tp of the power drive unit 12C, the temperature Tm of the electric motor 12A, and the temperature Tb of the battery 7 tend to rise. The first power drive unit temperature threshold Tp1, the first electric motor temperature threshold Tm1, and the first battery temperature threshold Tb1 are set for the purpose of prohibiting the seat 4 from moving to the high position when the temperature Tp of the power drive unit 12C, the temperature Tm of the electric motor 12A, and the temperature Tb of the battery 7 are high.

If the SOC of the battery 7 drops, the electric power supplied to the electric motor 12A may drop and the drive rotational speed of the electric motor 12A may drop. Also, there is a possibility that the battery 7 may stop outputting for overdischarge protection. The first SOC threshold S1 is set for the purpose of prohibiting the seat 4 from moving to the high position when the SOC is low.

The control device 6 prohibits the lifting drive performed by the lifting device 5 when the lifting prohibition condition is satisfied (the determination result in S2 is Yes). Thus, even if the user presses the lifting switch 41B, the seat 4 is not lifted. At this time, the control device 6 may cause the indicator 43 to notify an error. In other embodiments, the control device 6 may cause an audio output part such as a speaker or a buzzer to give an audible error notification.

When the lifting prohibition condition is not satisfied (the determination result in S2 is No), the control device 6 drives the lifting device 5 to lift (S4). The control device 6 drives the lifting device 5 to lift until the seat 4 reaches the high position. The control device 6 determines whether the seat 4 has reached the high position based on the signal from the seat position sensor 46.

When the control device 6 determines that the seat 4 is not at the low position in the determination of step S1, the control device 6 drives the lifting device 5 to lower (S5). The control device 6 drives the lifting device 5 to lower until the seat 4 reaches the low position. The control device 6 determines whether the seat 4 has reached the low position based on the signal from the seat position sensor 46.

According to the above lifting control, the control device 6 prohibits the lifting drive of the lifting device 5 when the seat 4 is at the low position and the lifting prohibition condition is satisfied. Therefore, the safety of the vehicle 1 is further improved. When the SOC drops, when the temperature Tp of the power drive unit 12C is high, or when the road surface is inclined by a predetermined value or more, since movement of the seat 4 to the high position is prohibited, the safety of the vehicle 1 is further improved.

Figure 9:
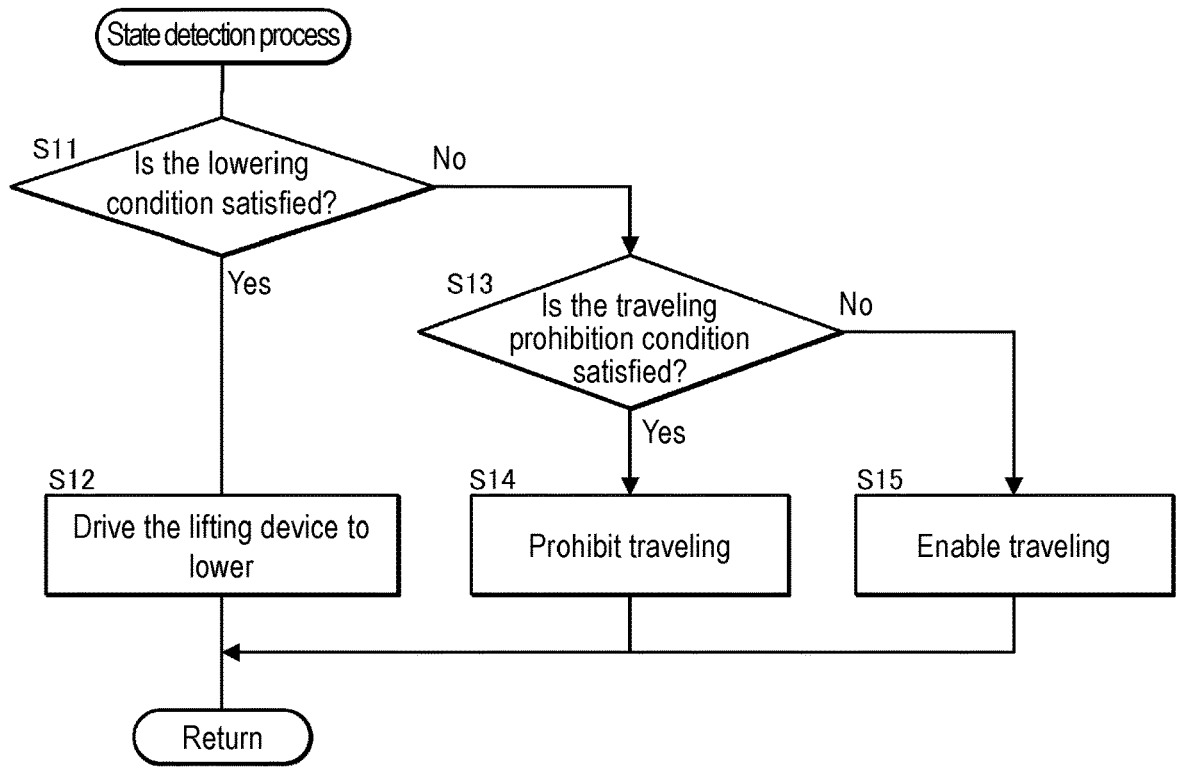
FIG. 9 is a flowchart showing the procedure of the state detection process.

When the seat 4 is at the high position, the control device 6 executes a state detection process shown in FIG. 9 at predetermined time intervals.

In the state detection process, the control device 6 first determines whether a lowering condition is satisfied (S11). The lowering condition includes at least one of the temperature Tp of the power drive unit 12C being equal to or higher than the second power drive unit temperature threshold Tp2 that is equal to or higher than the first power drive unit temperature threshold Tp1, the temperature Tm of the electric motor 12A being equal to or higher than the second electric motor temperature threshold Tm2 that is equal to or higher than the first electric motor temperature threshold Tm1, the temperature Tb of the battery 7 being equal to or higher than the second battery temperature threshold Tb2 that is equal to or higher than the first battery temperature threshold Tb1, the SOC of the battery 7 being equal to or less than the second SOC threshold S2 that is equal to or less than the first SOC threshold S1, and the inclination angle acquisition part being abnormal.

The control device 6 may determine an abnormality of the inclination angle sensor 45 based on the signal from the inclination angle sensor 45. When the seat 4 is at the high position, the inclination angle θf of the vehicle body frame 2 is maintained within a predetermined range by inverted pendulum control. Therefore, the control device 6 may determine that the inclination angle sensor 45 is abnormal when the absolute value of the inclination angle θf of the vehicle body frame 2 detected by the inclination angle sensor 45 is equal to or greater than a predetermined angle threshold. Further, the control device 6 may determine that the inclination angle sensor 45 is abnormal when the signal from the inclination angle sensor 45 is not received.

When the lowering condition is satisfied (the determination result in S11 is Yes), the control device 6 drives the lifting device 5 to lower (S12). That is, the seat 4 is forcibly moved from the high position to the low position. The lowering drive of the lifting device 5 may be performed by driving of an electric motor. In addition, the seat 4 may be lowered by releasing the holding mechanism 5A of the lifting device 5.

When the lowering condition is not satisfied (the determination result in S11 is No), the control device 6 determines whether the traveling prohibition condition is satisfied (S13). The traveling prohibition condition includes at least one of the temperature Tp of the power drive unit 12C being equal to or higher than the third power drive unit temperature threshold Tp3 that is lower than the second power drive unit temperature threshold Tp2, the temperature Tm of the electric motor 12A being equal to or higher than the third electric motor temperature threshold Tm3 that is lower than the second electric motor temperature threshold Tm2, the temperature Tb of the battery 7 being equal to or higher than the third battery temperature threshold Tb3 that is lower than the second battery temperature threshold Tb2, and the SOC of the battery 7 being equal to or less than the third SOC threshold S3 that is higher than the second SOC threshold S2.

When the traveling prohibition condition is satisfied (the determination result in S13 is Yes), the control device 6 prohibits the vehicle 1 from traveling (S14). The control device 6 may set the traveling prohibition flag to 1, for example. Then, when the traveling prohibition flag is 1, the control device 6 may prohibit the traveling drive of the drive unit 3 based on the inclination angle θf of the vehicle body frame 2. Thus, even if the inclination angle θf of the vehicle body frame 2 changes, the control device 6 performs only posture control based on inverted pendulum control, and does not perform traveling control.

When the traveling prohibition condition is not satisfied (the determination result in S13 is No), the control device 6 enables the vehicle 1 to travel (S15). The control device 6 may set the traveling prohibition flag to 0, for example. Then, when the traveling prohibition flag is 0, the control device 6 may enable the traveling drive of the drive unit 3 based on the inclination angle θf of the vehicle body frame 2.

With the above-described state detection process, the seat 4 is lowered to the low position when the seat 4 is at the high position and the lowering condition is satisfied, so the safety of the vehicle 1 is further improved. Further, since the vehicle 1 is prohibited from traveling when the seat 4 is at the high position and the traveling prohibition condition is satisfied, the safety of the vehicle 1 is further improved.

Although specific embodiments have been described above, the disclosure is not limited to the above embodiments and can be widely modified. The contents of the lifting prohibition condition, the lowering condition, and the traveling prohibition condition may be changed according to the purpose. A speed sensor may be provided to measure the speed of the vehicle 1, and when the speed is equal to or greater than a predetermined threshold, the lifting prohibition condition may be satisfied.

What is claimed is:

1. A vehicle, comprising:
   a vehicle body frame;
   a drive unit provided in the vehicle body frame and movable on a floor;
   a seat arranged above the vehicle body frame and supporting buttocks of a user;
   a lifting device provided between the vehicle body frame and the seat and lifting or lowering the seat between a low position and a high position;
   a battery provided in the vehicle body frame; and
   a control device controlling the drive unit and the lifting device,
   wherein the control device prohibits lifting drive of the lifting device in response to the seat being at the low position and a lifting prohibition condition being satisfied.

2. The vehicle according to claim 1, wherein the drive unit comprises an electric motor and a power drive unit that supplies electric power to the electric motor,
   the control device determines whether the vehicle has an abnormality,
   the vehicle comprises:
   an inclination angle acquisition part acquiring an inclination angle of the vehicle body frame with respect to a horizontal plane;

an SOC acquisition part acquiring an SOC of the battery; and a temperature acquisition part acquiring a temperature of at least one of the power drive unit, the electric motor, and the battery, and the lifting prohibition condition comprises at least one of the inclination angle being equal to or greater than a first angle threshold, the temperature of the power drive unit being equal to or higher than a first power drive unit temperature threshold, the temperature of the electric motor being equal to or higher than a first electric motor temperature threshold, the temperature of the battery being equal to or higher than a first battery temperature threshold, the SOC of the battery being equal to or less than a first SOC threshold, and the control device detecting an abnormality of the vehicle.

3. The vehicle according to claim 2, wherein the control device drives the lifting device to lower in response to the seat being at the high position and a lowering condition being satisfied.

4. The vehicle according to claim 3, wherein the lifting device comprises a holding mechanism for holding the seat at the high position, and the lifting device moves the seat from the high position to the low position by releasing the holding mechanism.

5. The vehicle according to claim 3, wherein the lowering condition comprises at least one of the temperature of the power drive unit being equal to or higher than a second power drive unit temperature threshold that is equal to or higher than the first power drive unit temperature threshold, the temperature of the electric motor being equal to or higher than a second electric motor temperature threshold that is equal to or higher than the first electric motor temperature threshold, the temperature of the battery being equal to or higher than a second battery temperature threshold that is equal to or higher than the first battery temperature threshold, and the SOC of the battery being equal to or less than a second SOC threshold that is equal to or less than the first SOC threshold.

6. The vehicle according to claim 4, wherein the lowering condition comprises at least one of the temperature of the power drive unit being equal to or higher than a second power drive unit temperature threshold that is equal to or higher than the first power drive unit temperature threshold, the temperature of the electric motor being equal to or higher than a second electric motor temperature threshold that is equal to or higher than the first electric motor temperature threshold, the temperature of the battery being equal to or higher than a second battery temperature threshold that is equal to or higher than the first battery temperature threshold, and the SOC of the battery being equal to or less than a second SOC threshold that is equal to or less than the first SOC threshold.

7. The vehicle according to claim 3, wherein the control device determines whether the inclination angle acquisition part is abnormal based on a signal from the inclination angle acquisition part, and the lowering condition comprises at least one of the temperature of the power drive unit being equal to or higher than a second power drive unit temperature threshold that is equal to or higher than the first power drive unit temperature threshold, the temperature of the electric motor being equal to or higher than a second electric motor temperature threshold that is equal to or higher than the first electric motor temperature threshold, the temperature of the battery being equal to or higher than a second battery temperature threshold that is equal to or higher than the first battery temperature threshold, the SOC of the battery being equal to or less than a second SOC threshold that is equal to or less than the first SOC threshold, and the inclination angle acquisition part being abnormal.

8. The vehicle according to claim 4, wherein the control device determines whether the inclination angle acquisition part is abnormal based on a signal from the inclination angle acquisition part, and the lowering condition comprises at least one of the temperature of the power drive unit being equal to or higher than a second power drive unit temperature threshold that is equal to or higher than the first power drive unit temperature threshold, the temperature of the electric motor being equal to or higher than a second electric motor temperature threshold that is equal to or higher than the first electric motor temperature threshold, the temperature of the battery being equal to or higher than a second battery temperature threshold that is equal to or higher than the first battery temperature threshold, the SOC of the battery being equal to or less than a second SOC threshold that is equal to or less than the first SOC threshold, and the inclination angle acquisition part being abnormal.

9. The vehicle according to claim 5, wherein the control device prohibits traveling drive of the drive unit in response to the seat being at the high position and a traveling prohibition condition being satisfied.

10. The vehicle according to claim 7, wherein the control device prohibits traveling drive of the drive unit in response to the seat being at the high position and a traveling prohibition condition being satisfied.

11. The vehicle according to claim 9, wherein the traveling prohibition condition comprises at least one of the temperature of the power drive unit being equal to or higher than a third power drive unit temperature threshold that is lower than the second power drive unit temperature threshold, the temperature of the electric motor being equal to or higher than a third electric motor temperature threshold that is lower than the second electric motor temperature threshold, the temperature of the battery being equal to or higher than a third battery temperature threshold that is lower than the second battery temperature threshold, and the SOC of the battery being equal to or less than a third SOC threshold that is greater than the second SOC threshold.

12. The vehicle according to claim 1, wherein the control device controls the drive unit based on inverted pendulum control.

13. The vehicle according to claim 2, wherein the control device controls the drive unit based on inverted pendulum control.

14. The vehicle according to claim 3, wherein the control device controls the drive unit based on inverted pendulum control.

15. The vehicle according to claim 4, wherein the control device controls the drive unit based on inverted pendulum control.

16. The vehicle according to claim 5, wherein the control device controls the drive unit based on inverted pendulum control.

17. The vehicle according to claim 7, wherein the control device controls the drive unit based on inverted pendulum control.

18. The vehicle according to claim 9, wherein the control device controls the drive unit based on inverted pendulum control.

19. The vehicle according to claim 1, further comprising at least one leg that extends downward from the seat and comprises a roller at a lower end,
   the roller is separated from the floor in response to the seat being at the high position, and
   the roller contacts the floor in response to the seat being at the low position.

20. The vehicle according to claim 1, wherein the drive unit is movable in all directions along the floor.

* * * * *